Figures 1, 2:
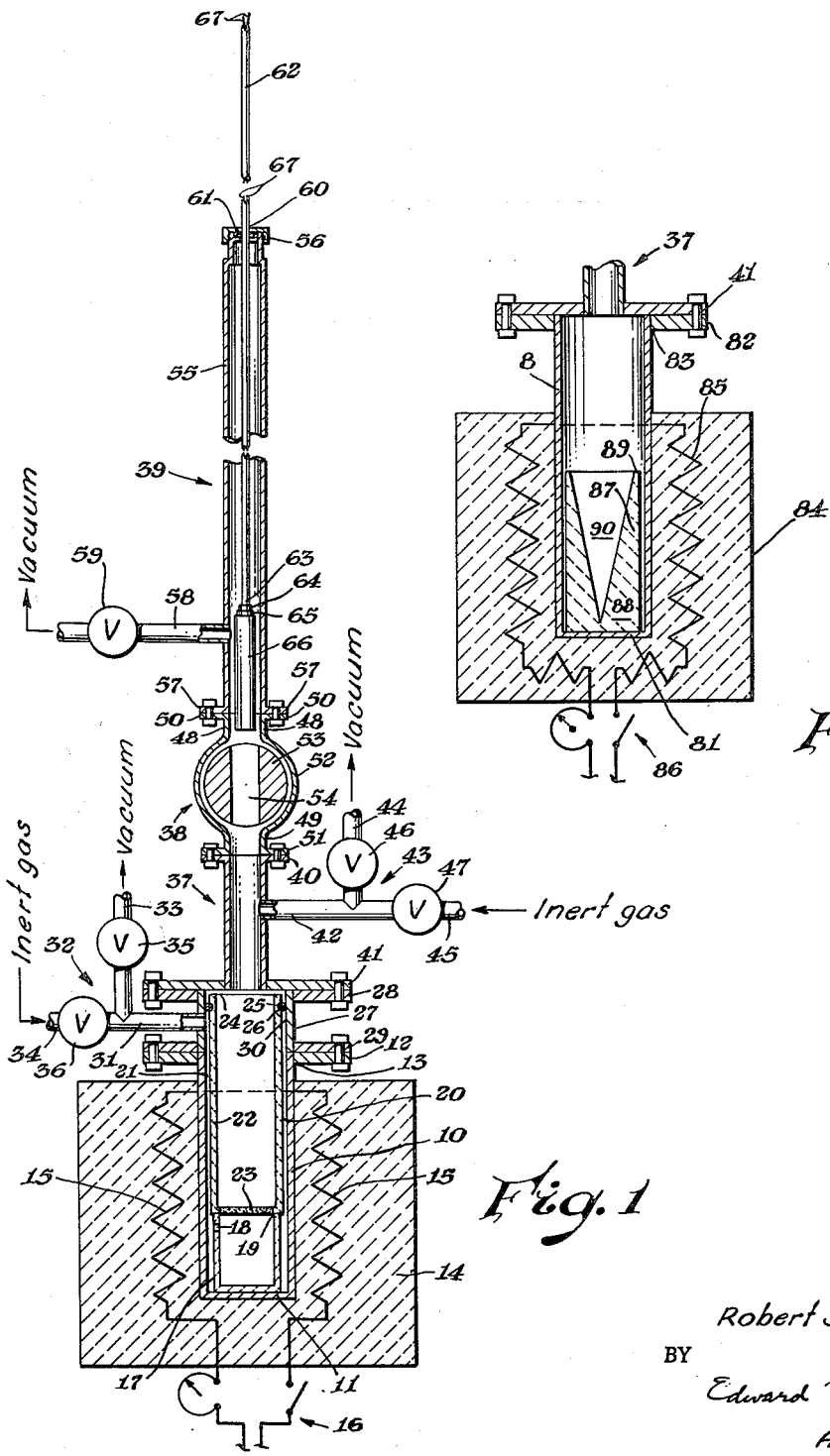

Sept. 11, 1962 R. J. TEITEL 3,053,650
PROCESS FOR RECOVERING URANIUM VALUES
Filed July 2, 1959 5 Sheets-Sheet 1

INVENTOR.
Robert J. Teitel
BY
Edward E. Schilling
AGENT

INVENTOR.
Robert J. Teitel
BY Edward E. Schilling
AGENT

INVENTOR.
Robert J. Teitel

INVENTOR.
Robert J. Teitel
BY Edward E. Schilling
AGENT

United States Patent Office 3,053,650
Patented Sept. 11, 1962

3,053,650
PROCESS FOR RECOVERING URANIUM VALUES
Robert J. Teitel, Midland, Mich., assignor to The Dow Chemical Company, Midland, Mich., a corporation of Delaware
Filed July 2, 1959, Ser. No. 825,389
16 Claims. (Cl. 75—84.1)

This invention relates to an improved method for recovering uranium values and is particularly concerned with a pyrometallurgical process for processing alloys or compositions containing uranium and aluminum, such as spent nuclear reactor fuel, to purify or concentrate the compositions with respect to uranium and recover uranium as an intermetallic compound with aluminum. If desired, the recovered uranium may be separated from this intermetallic compound during processing and obtained as uranium metal.

This application is a continuation-in-part of my copending application U.S. Serial No. 757,419, filed August 26, 1958, now abandoned.

Heretofore spent nuclear reactor fuel elements and fuel element fabrication plant scrap have been refined by chemical rather than metallurgical processing methods. Chemical methods are subject to certain serious disadvantages such as the use of large quantities of corrosive acid solutions, the handling of large volumes of solutions, the numerous processing steps, the difficulties in handling highly radioactive materials during lengthy processing, the necessity to reduce purified uranium compounds to the metallic state in the process of obtaining refined metal, and the problem of concentrating radioactive waste solutions for disposal and storage. These problems are overcome by the use of the pyrometallurgical method hereinafter disclosed and claimed.

It is an object of the present invention to provide a method widely adaptable to recovering and refining uranium values.

It is another object of the invention to provide a method by which it is inherently possible to refine and nearly quantitatively recover uranium values.

It is another object of the invention to provide a method for recovering uranium values as metallic uranium in alloyed or unalloyed form.

It is a further object of this invention to provide a method for recovering uranium values which is readily carried out by remote controls.

It is a still further object of this invention to provide a method for reclaiming uranium values by which radioactive contaminants removed from the treated uranium containing composition are recovered in a concentrated readily disposable form.

Other objects and advantages of the invention will become apparent to those skilled in the art upon becoming familiar with the following description and claims, reference being had to the appended drawings.

This invention is based upon the discovery that by heating a mixture of a composition comprising uranium metal and aluminum together with a magnesium metal selected from magnesium and magnesium-zinc alloys containing at least 20 weight percent of magnesium so as to form a melt of the magnesium metal and at least a part of the aluminum, and subsequently lowering the temperature of the mixture so as to bring about the more complete precipitation of an intermetallic uranium-aluminum compound thereby formed, the uranium content of the mixture can be substantially quantitatively precipitated as an intermetallic uranium-aluminum compound which can be separated from the mixture by physical methods. If desired, the so-separated precipitate may be washed or treated with a molten group II metal selected from the group consisting of magnesium, zinc, and mixtures and alloys thereof thereby reducing or eliminating the aluminum content of the said precipitate leaving a substantially purified uranium product.

For the purposes of the specification and claims a magnesium metal is defined as a metal selected from the group consisting of magnesium, and magnesium zinc alloys containing at least 20 weight percent of magnesium and up to 80 weight percent of zinc.

FIGURE 1 of the appended drawings in which like numbers refer to like parts is a diagrammatic, schematic, sectional view of a furnace comprising a combination of parts suitable for use in carrying out the invention.

FIGURE 2 is a diagrammatic, schematic, sectional view showing only an alternative lower portion of a furnace which may be used with the superstructure of the furnace in FIG. 1 in carrying out the invention, according to a different embodiment thereof.

Figure 3:
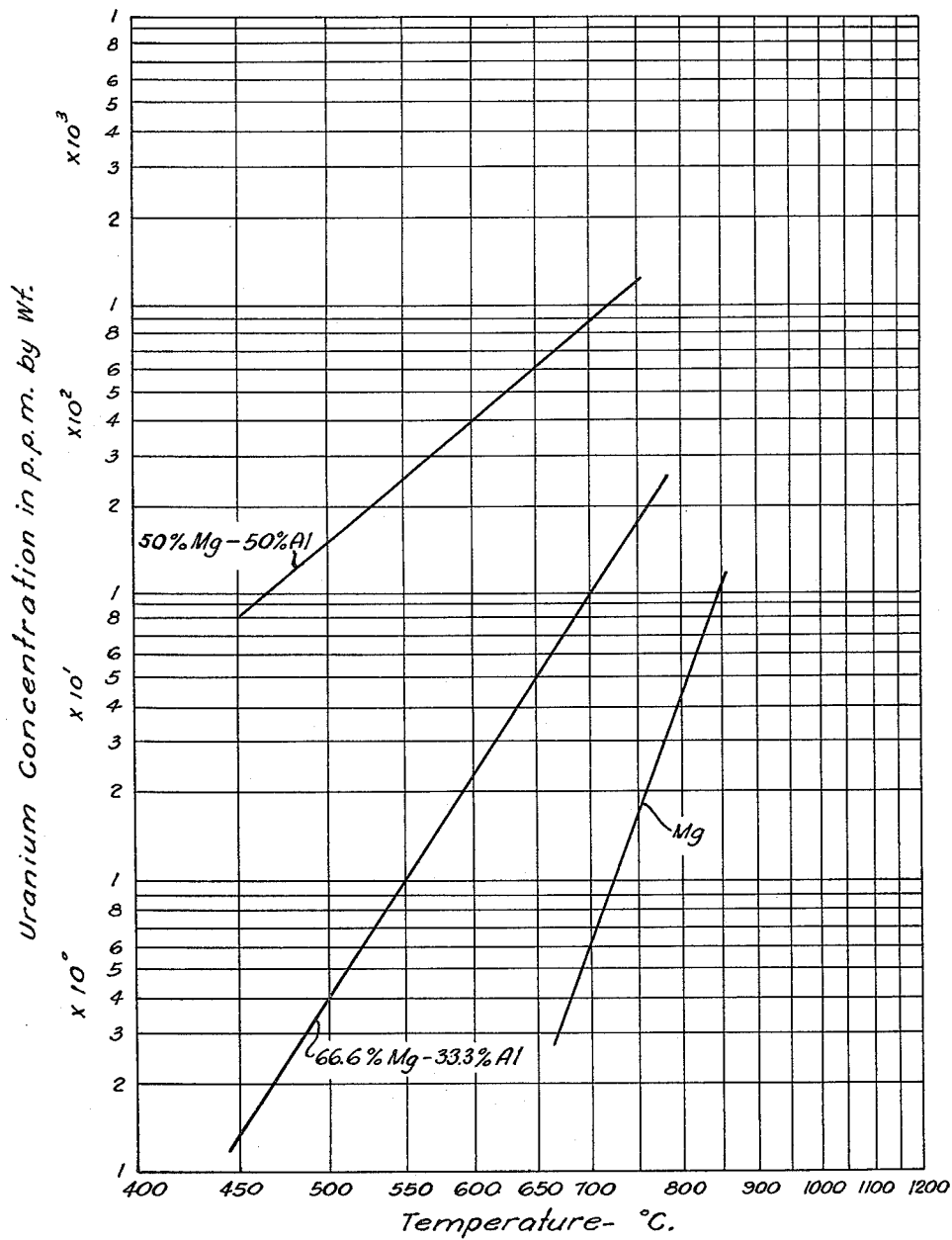

In FIG. 3 is shown graphically, as a function of temperature, the solubility of uranium metal in two different molten binary magnesium-aluminum alloys, and in molten magnesium.

Figure 4:
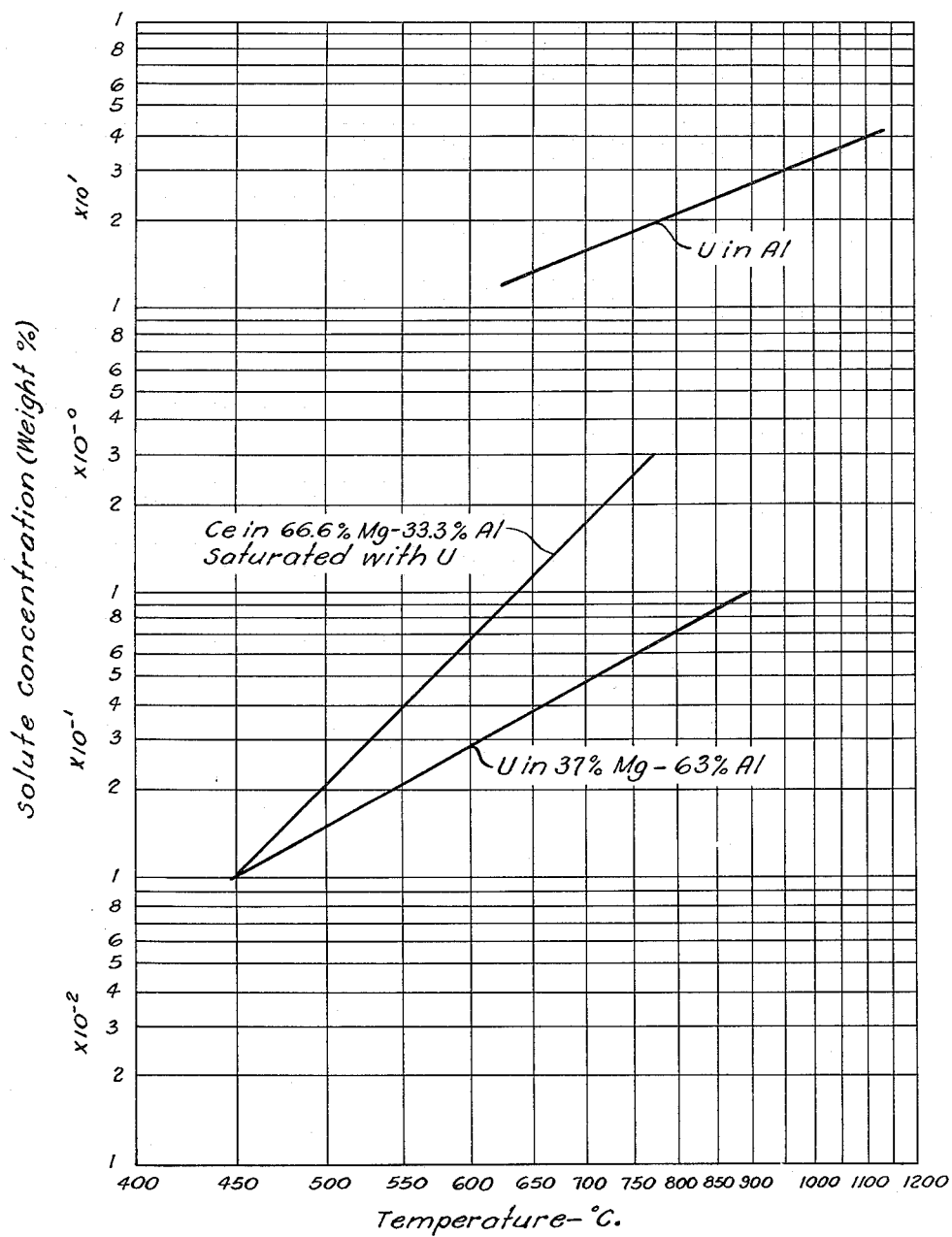

In FIG. 4 is similarly shown graphically, as a function of temperature, the solubility of uranium metal in molten aluminum and in a molten binary magnesium-aluminum alloy. Also shown is a similar solubility curve for cerium metal in a magnesium-aluminum alloy saturated with uranium metal.

Figure 5:
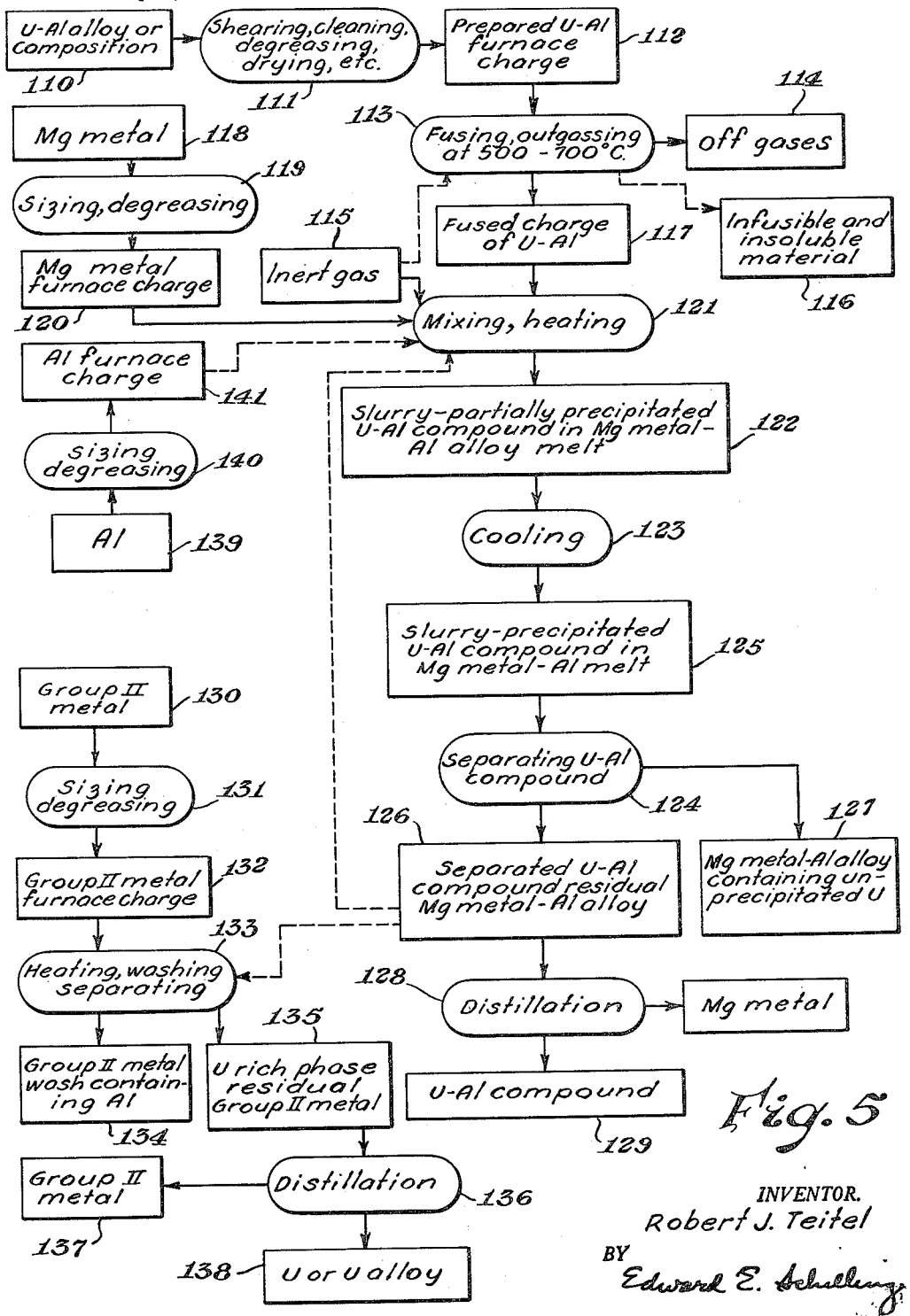

FIG. 5 is a schematic diagram illustrating a combination of steps in a preferred mode of carrying out the invention. Other combinations of steps within the spirit of the invention which may be used if desired are indicated by broken lines.

Figure 6:
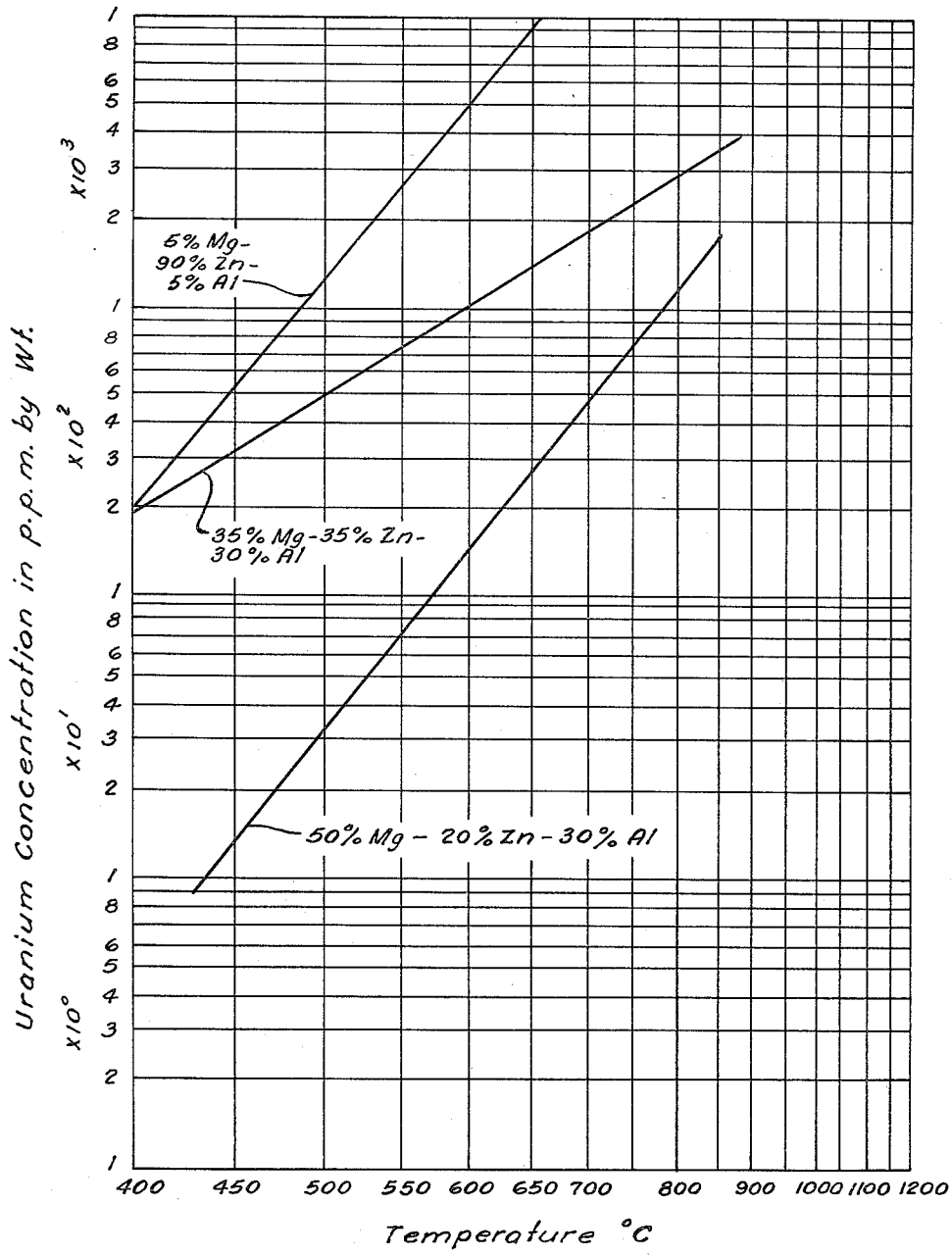

In FIG. 6 is shown graphically, as a function of temperature, the solubility of uranium metal in three different molten ternary magnesium-zinc-aluminum alloys.

Referring to FIG. 1 the furnace comprises a hollow cylindrical heating chamber 10 preferably of metallic construction, having a closed bottom 11 and an integrally formed radially outwardly extending flange 12 at the open top 13 thereof. The heating chamber is mounted in heating means comprising an insulated body 14 containing electrical resistance heating elements 15 connected to a source of electrical power and having therefor a suitable controlling means 16. A lower hollow cylindrical crucible, or liner 17 formed of suitable material such as a grade of graphite which is substantially non-porous to liquid metal or steel is disposed in upright position within and resting on the bottom 11 of the heating chamber. A hole 18 is formed through the sidewall of the lower crucible adjacent the open top 19 thereof to permit gases to pass in and out of the crucible. An upper hollow cylindrical crucible 20, or liner, is mounted in upright position telescoped within the heating chamber 10 and resting upon the top 19 of the lower crucible 17. The outside diameters of crucibles 17 and 20 are both sufficiently smaller than the inside diameter of heating chamber 10 so that an annular space 21 is defined therebetween. The sidewall 22 of the upper crucible is preferably formed of a grade of graphite which is substantially impervious to the passage of gases or molten metals therethrough. The bottom of the upper crucible is closed by a porous graphite disc 23 press fitted transversely across the lower end of the crucible. A disc, such as one ¼ to ⅜ inch thick and of a porosity corresponding to 50 or 60 grade frit as supplied by the National Carbon Co., is suitable. Adjacent the top 24 of the upper crucible in the portion extending above the heating chamber 10 is formed an annular peripheral groove 25 in which is seated an O-ring 26 of elastic material. Surrounding the same portion of the upper crucible 20 which extends above the heating chamber 10 is a vertical hollow cylindrical section 27 having a radially outwardly extending flange 28 formed at the upper end thereof and a similar flange 29 formed at the lower end. The lower flange 29 mates with and is mechanically coupled to the flange 12 of the heating chamber to form a gas-tight connection. O-ring 26 slideably engages the interior wall 30 of cylindrical section 27 whereby a gas-tight seal is formed therebetween. A pipe 31 provides a gas connection between the sidewall of cylindrical section 27 below the O-ring seal 26 and a pipe T 32, one branch 33 of which is connected to a vacuum pump not shown and the other branch 34 to a source of inert gas not shown through valves 35 and 36, respectively.

Mounted above cylindrical section 27 are means for introducing materials into the furnace and means for controlling the atmosphere above the furnace charge within upper crucible 20. As shown these means comprise in vertical relationship a tubular section 37, a valve section 38 and a gas lock 39.

Tubular section 37 is provided with upper and lower flanges 40 and 41 respectively. Flange 41 is mated with and mechanically coupled to flange 28 of the cylindrical section 27. A pipe 42 provides a gas connection between the sidewall of tubular section 37 and a pipe T 43, one branch 44 of which is connected to a vacuum pump not shown and the other branch 45 to a source of inert gas not shown through valves 46 and 47 respectively.

Valve section 38 is provided with upper and lower tubular extensions 48, 49 terminating in radially outwardly extending flanges 50 and 51, respectively, and a full-flow valve 52, such as that shown in the drawing, having a rotatable valve plug 53 with a bore 54 therethrough, the diameter of the bore being approximately as large as the inner diameter of tubular section 37. Other types of full flow valves such as a gate valve may also be used. Flange 51 is mounted on and sealed against flange 40 of tubular section 37.

Gas lock 39 comprises a tubular section 55 threadably closed by a cap 56 at the upper end and having a radially outwardly extending flange 57 at the lower end thereof mounted on and sealed against flange 50 of valve section 38. Pipe 58 provides a gas connection between the sidewall of the gas lock and vacuum pump means not shown through valve 59. Cap 56 having an opening 60 formed therethrough is equipped with a packing gland 61 formed of suitable elastic material which allows slidable movement of a metal probe 62 through the opening while maintaining a reduced pressure atmosphere inside the gas lock.

Probe 62 comprises an elongated hollow tube, for example of stainless steel construction, sufficiently long to extend from above cap 56 downwardly to about the lower end of upper crucible 20. Probe 62 is closed at the lower end 63 and has an integrally formed lower extension 64 of solid rod. The extension 64 is externally threaded so as to be adapted to threadably engage further extensions internally bored and tapped. Further extensions may include a graphite adapter 65 which in turn threadably engages a magnesium, magnesium-zinc, zinc or aluminum metal bar or rod 66 which is to be added to the furnace charge. The graphite adapter 65 permits entirely immersing the metal bar 66 in a molten furnace charge without exposing steel parts of probe 62 thereto. Temperatures inside the furnace assembly are sensed by a thermocouple junction inserted in probe 62 to the lower end 63 thereof. Leads 67 from the junction are connected to a suitable device, not shown, for measuring electromotive force.

In FIG. 2 is shown an alternative lower portion of a furnace which may be used in place of the assembly of the furnace shown below the flange 41 in FIG. 1. The so modified apparatus may be used for carrying out the invention according to an embodiment in which the separation of uranium-aluminum intermetallic compound from magnesium metal-aluminum alloy is obtained by settling. The lower furnace portion comprises a hollow cylindrical heating chamber 8 preferably of metallic construction, having a closed bottom 81 and an integrally formed radially outwardly extending flange 82 at the open top 83 thereof. The heating chamber is mounted in heating means comprising an insulated body 84 containing electrical resistance heating elements 85 connected to a suitable source of electrical power not shown and having appropriate controlling means generally indicated by numeral 86. Disposed within and resting on the bottom 81 of the heating chamber is a generally cylindrical crucible 87 having a closed bottom 88, an open top 89 and a cavity 90 in the form of an inverted cone with the apex of the cavity near the bottom of the crucible. The crucible is formed of suitable material such as a grade of graphite which is substantially impervious to liquid metal and to which solidified castings do not generally adhere. Flange 82 of the heating chamber is mated with and sealed against flange 41 of tubular section 37. The flange and the tubular section correspond to the same two parts shown in FIG. 1.

In carrying out the invention, reference being had mainly to FIG. 5, uranium-aluminum alloy 110, or a composition 110 containing uranium and aluminum metals, selected for processing should preferably have an average composition of less than about one part by weight uranium to nine parts of aluminum in order to have a low-melting composition, though compositions with a higher uranium content may be treated. On the other hand, considerations based on solubility curves as shown in FIGS. 3, 4 and 6 indicate that material selected for processing should contain at least 1 weight percent uranium to permit efficient recoveries of uranium of the order of 99.9 percent or better from the magnesium metal-aluminum melts formed in the processing.

If necessary, material to be processed is mechanically reduced, 111, to a convenient size for charging into a furnace, dried to remove moisture, and then degreased, 111, as with $CCl_4$, if indicated. The so-prepared uranium-aluminum furnace charge, 112, is charged to a furnace equipped with a heating chamber suitable for operating at elevated temperatures, for example, up to 700° C. and preferably up to 850 or 1000° C., while maintaining a reduced pressure and/or an inert gas atmosphere within the heating chamber. It is desirable that the heating chamber be provided with a graphite liner or crucible to prevent contamination of the melt by furnace materials. The furnace may be one designed and equipped for differential pressure filtrations, for example, as shown in FIG. 1, or it may be one equipped for making separations by settling. The lower portion of a furnace of the latter type is shown in FIG. 2.

The furnace heating chamber is evacuated, heating is commenced and the furnace charge, 112, is fused and outgassed, 113, at a temperature above 650° C., and preferably in the range of 700 to 800° C. After the charge is fused, removal of residual volatile components or off-gases, 114, may be accomplished more efficiently by gas sparging with an inert gas, 115, if desired. If the furnace charge contains spent fuel element material, the off-gases, 114, containing volatile radioactive fission products should be recovered or trapped and suitably disposed of as by absorbing in a charcoal filled trap connected in series with a vacuum line to the furnace. In some cases, it is desirable to employ a furnace equipped for first filtering or otherwise separating any insoluble or infusible material, 116, present in the prepared furnace charge, 112, before proceeding to the precipitation of the uranium-aluminum intermetallic compound.

Magnesium, 118, conveniently in the form of rods or bars, is sized and degreased, 119. Of the so-prepared magnesium metal furnace charge, 120, an amount by weight equal to from about one-third to ten times the weight of the fused uranium-aluminum charge, 117, is added thereto, the mixture preferably being held under an inert gas atmosphere within the heating chamber and at a temperature low enough to avoid excessive vaporization of the added magnesium. For example, the furnace temperature should not exceed about 950° C. under conditions of one atmosphere of inert gas. The total charge resulting from combining the magnesium metal furnace charge, 120, with the fused outgassed uranium-aluminum charge, 117, is heated, 121, and held at a temperature at which a melt will form in practical times, preferably about 660° C. or higher and is then mixed mechanically, 121, as by means of a probe, or by gas sparging as by passing an inert gas upwardly through the filter disc, 23, as shown in the furnace in FIG. 1, to prevent stratification. Precipitation of about 90 percent of the uranium as an intermetallic compound with aluminum (probably $UAl_3$) occurs at once upon fusing and admixing the magnesium charge, the rest of the aluminum and uranium present remaining fused and admixed as a magnesium-aluminum melt. Impurities, such as fission products, entering the process as contaminants present in the uranium-aluminum charge, 112, are distributed between the liquid and solid phases mainly according to equilibrium distribution coefficients, though processing times may not be sufficient for equilibrium concentrations to be obtained.

In purifying uranium compositions it is sometimes advantageous to alter the said equilibrium distribution coefficients in order to effect a more favorable separation of those contaminants which enter the magnesium-rich phase less readily. One way to alter the equilibrium distribution coefficients is to substitute a magnesium-zinc composition for the magnesium employed in the precipitation step. For example, the said magnesium may be replaced by magnesium-zinc containing up to 50 weight percent of zinc. Greater proportions of zinc may be used, if desired, such as magnesium-zinc containing up to 80 weight percent of zinc, and uranium-aluminum intermetallic compound is still preferentially precipitated. However, the solubility of uranium in high zinc Mg—Zn—Al melts is too high to permit good uranium recoveries. As indicated above, magnesium and magnesium-zinc compositions containing at least 20 weight percent of magnesium are referred to herein as magnesium metal.

In a simplified modification of the described fusion and precipitation process, the uranium-aluminum furnace charge, 112, and the magnesium metal furnace charge, 120, are first admixed then heated and fused together. While the stepwise process is more rapid and avoids the problem of slow diffusion of contaminants from the solid phase uranium-aluminum intermetallic compound to the magnesium metal-aluminum melt, the simplified process often results in superior purification in avoiding adsorption of impurities on precipitated uranium-aluminum intermetallic compound.

Upon allowing the slurry, 122, of uranium-aluminum intermetallic compound in molten magnesium metal-aluminum to cool, 123, to a temperature above and within 200 centigrade degrees above the freezing point of the magnesium metal-aluminum melt, but preferably within 100 centigrade degrees above the freezing point of the melt, and while maintaining the slurry in this temperature range for a period of time, or holding period, additional uranium-aluminum intermetallic compound is precipitated. In the table are listed data from two experiments in which differing holding temperatures were maintained. The values illustrate typical changes in residual uranium levels in molten magnesium metal-aluminum after various time intervals following precipitation of most of the intermetallic compound in accordance with the invention. At the times indicated a filtered sample of the supernatant melt was taken using a sampling cup on the end of a probe. The sample was removed from the furnace, allowed to cool, and analyzed for uranium content.

| Solubilty, Run No. | Time interval before sampling, minutes | Temperature, °C. | Concentration of U in melt, p.p.m. |
| --- | --- | --- | --- |
| 1 | 0 | 448 | 30 |
| 1 | 23 | 448 | 9.7 |
| 1 | 45 | 448 | 6.8 |
| 1 | 345 | 448 | 6.7 |
| 1 | 1,335 | 448 | 2.9 |
| 2 | 40 | 499 | 15 |
| 2 | 130 | 499 | 9.5 |
| 2 | 3,945 | 499 | 4 |

The precipitated uranium-aluminum intermetallic compound is separated, 124, as by settling or by differential pressure filtration of the slurry, 125.

The filtration separation method is generally more suitable for small scale production with the highest recovery efficiency. An important advantage of this separation method is that subsequent processing steps, to either further purify the precipitated uranium-aluminum intermetallic compound or to remove aluminum therefrom, may be conveniently carried out in the same equipment and without the necessity of handling or transferring the precipitate to other vessels.

In using the filtration method, the slurry, 125, contained above a graphite filter disc such as that identified by numeral 23 in FIG. 1, is filtered upon increasing the pressure of the inert atmosphere above the slurry to produce about a one atmosphere pressure differential across the filter disc, the magnesium-metal-aluminum melt being forced through the filter disc while the uranium-aluminum intermetallic compound, 126, still wetted by the magnesium metal-aluminum melt, is retained. Means for receiving fused, filtered metal, 127, such as the lower crucible, 17, in FIG. 1, is disposed beneath the filter disc in communication with the lower end of the graphite filter crucible. The fused metal, 127, containing at least the bulk of the contaminants from the uranium-aluminum furance charge, 112, may be cast, if desired, into a suitable shape for convenient disposal of the contaminants in relatively concentrated form.

The precipitated uranium-aluminum intermetallic compound, 126, remaining on the graphite filter disc is not entirely freed of magnesium metal-aluminum melt, 127, by differential pressure filtration. This residual magnesium metal, being more volatile than aluminum or uranium, is removed by distillation, 128, according to well-known methods. Uranium-aluminum intermetallic compound, 129, so recovered and purified, may then be mechanically removed from the graphite crucible and further alloyed and cast into new fuel elements if desired, or the intermetallic compound can be purified and treated according to well-known wet chemical processes to produce highly purified uranium compounds or uranium metal.

On the other hand, the separated uranium-aluminum compound, 126, may be freed, gradually, of its aluminum content by successive treatments, which may be carried out, if desired, in the previously described furnace shown in FIG. 1.

The treatments comprise contacting the separated uranium-aluminum compound 126 with a molten metal selected from a group II metal, 130, selected from the group consisting of magnesium, zinc and mixtures or binary alloys thereof.

Magnesium and magnesium-zinc alloys containing up to about 75% by weight of zinc are desirably used in molten form to wash $UAl_3$ and thereby dissociate the intermetallic compound. Aluminum from the intermetallic compound enters the magnesium or magnesium-zinc melt and upon sufficiently contacting the solid phase $UAl_3$ with the said melt, the $UAl_3$ is converted to uranium metal, possibly forming $UAl_2$ as an intermediate. Residual magnesium and magnesium-zinc alloy are removable by distillation from the so-obtained uranium metal upon heating the uranium metal.

Zinc and magnesium-zinc binary alloys containing greater than about 75 weight percent of zinc are also useful in freeing uranium-aluminum intermetallic compound of its aluminum content though the mechanism is somewhat different. Zinc and the said high zinc magnesium alloys also dissociate $UAl_3$ to $UAl_2$ but upon further treatment of $UAl_2$ with the said zinc or magnesium-zinc alloy the uranium compound is converted to the intermetallic compound $UZn_9$ which forms a solid precipitate that is separable from the concomitant aluminum-zinc or magnesium-aluminum-zinc melt as by filtration or settling. Uranium metal is then obtained from $UZn_9$ upon distillation therefrom of the zinc content. While uranium losses into the filtered melt are somewhat higher using high zinc magnesium-zinc washes, the high zinc alloys are useful in effecting removal from $UAl_3$ of magnesium-insoluble contaminants, such as zirconium. The variation of solubility with temperature for uranium in the ternary composition 5% magnesium-90% zinc-5% aluminum is illustrated in FIG. 6.

In carrying out the removal of aluminum from uranium-aluminum intermetallic compound using the apparatus of FIGURE 1, the said group II metal, 130 is prepared in the same manner as the magnesium metal furnace charge, 120, that is, cleaned and dried, 131, and reduced in size, if necessary. The so-prepared metal, 132, is charged to the separated intermetallic compound, 126, held above the graphite filter, identified by numeral 23 in FIG. 1. The charge is heated, 133, sufficiently for the group II metal to fuse and the fused metal is left in contact with the intermetallic compound for from about 15 minutes to 2 hours, though other times may be used if desired. Then the fused metal wash, 134, now containing aluminum, is removed, as by filtration, 133, from the solid uranium-rich phase, 135. The washing steps are repeated as many times as necessary to effect as complete removal of aluminum as desired. The uranium-rich phase, 135, is then further purified by distillation, 136, therefrom of residual group II metal, 137. Substantially pure uranium metal, 138, may thus be obtained.

If it is desired to effect still further purification of the uranium-aluminum intermetallic compound, my method is admirably suited to the carrying out of additional optional processing steps applied to the separated precipitated intermetallic compound, 126. For example, further purification of uranium processed as described hereinabove is obtained upon fusing the intermetallic compound, 126, and reprecipitating it with magnesium metal added in about the same proportions and in the same manner described as step 121. During the course of this additional processing, impurities present in the precipitate are again distributed between the liquid and solid phases. The magnesium metal-aluminum melt is then separated from reprecipitated uranium-aluminum intermetallic compound in the same manner described as step 124. This repurification process may be repeated one or more times. Uranium losses for each cycle, when properly carried out, are generally less than 1% and may be less than 0.01%, though higher losses may be tolerated in some applications, as in reduction of uranium compounds.

The purification of recycled uranium-aluminum intermetallic compound as described above can be made even more effective upon first adding to the separated intermetallic compound, 126, metallic aluminum, 139, prepared, 140, as a furnace charge, 141, and by fusing, 121, the admixture, thus allowing distribution, between the uranium-rich phase and the magnesium-rich phase, of impurities soluble in a magnesium metal-aluminum melt but relatively poorly removed as in the purification of recycled $UAl_3$ using molten magnesium, magnesium-zinc or zinc alone. A suitable amount of metallic aluminum 136 employed in the said recycle process is about two times the weight of the separated uranium-aluminum intermetallic compound but in any event the amount added should not reduce the percentage of uranium in the resulting melt to the point that poor recoveries are obtained. After repeating the precipitation of uranium-aluminum compound with a magnesium metal as at step 121 and cooling the mixture as at 123, the so-purified intermetallic compound may be separated, 124, and freed of residual magnesium metal as at step 128 or freed of aluminum as at step 133 and residual group II metal as at step 136, each separation being carried out as previously described.

The settling method of separating, 124, precipitated uranium-aluminum intermetallic compound from the slurry, 125, is suitable for processing large quantities of uranium and is especially adapted to processing wherein a uranium-aluminum alloy is desired as the end product. In using the method, the slurry is usually cast into a vertically elongated mold during the holding period when precipitation of the intermetallic compound is still taking place, and the solids are allowed to settle to the lower portion of the casting. At the end of the holding period the entire casting is allowed to solidify. The cooled casting is examined, as by radiological or metallographic methods to locate the limits of the uranium-containing portion so that that portion, 126, may be severed from the remainder, 127, of the casting.

This severed portion, 126, may be freed of magnesium metal by well-known methods of distillation, 128, of the residual magnesium metal. The so obtained uranium-aluminum alloy may be further alloyed to produce alloys suitable for the construction of fuel elements.

If desired, the severed portion, 126, containing uranium-aluminum intermetallic compound and residual magnesium metal may be further purified by reprocessing the separated material one or more times, that is, repeating step 121 while employing additional aluminum, 141, and/or magnesium metal, 120, followed by carrying out steps 123, 124, and 128 as described immediately above using settling techniques for carrying out separations.

Separated uranium-aluminum intermetallic compound, 126, obtained by settling methods, may also be further treated by repeatedly contacting it with a molten group II metal in a suitable furnace and separating the group II metal-rich phase thereby partially or substantially entirely freeing the uranium of aluminum. The uranium phase, 135, may then be freed of residual group II metal, 137, by distillation as at step 136.

In carrying out the invention according to a preferred embodiment using the apparatus shown in FIG. 1, the apparatus is opened to admit a furnace charge as by disconnecting flanges 28 and 41 and raising the superstructure. The prepared furnace charge of uranium-aluminum alloy is placed in upper crucible 20 and the apparatus is reassembled by replacing the superstructure and reconnecting flanges 28 and 41. Gas lock section 39 is opened as by removing cap 56 having probe 62 extending therethrough and a prepared cleaned magnesium metal bar or rod 66 is threaded onto graphite adapter 65 at the lower end of the probe. The magnesium metal bar or rod is selected to comprise an appropriate amount of a magnesium metal to form, on heating with the uranium-aluminum charge, a magnesium metal-aluminum melt of a desired composition. The magnesium metal piece 66 and the lower end of the probe 62 are then inserted into the body of the gas lock and the gas lock is closed again with cap 56. The entire assembly is evacuated as through valves 35, 46 and 59. Valve 35 is then closed and heating is started by turning on electrical heating elements 15. Evacuation, or outgassing, of the furnace assembly and the uranium-aluminum charge is continued as the charge is brought to a temperature in the range of 660 to 1000° centigrade, and preferably to a temperature at least sufficient to cause fusion of the charge. Thorough outgassing of the fused uranium-aluminum charge may be effected by gas sparging, if desired, by opening valve 36 and admitting an inert gas to pipe 31 at sufficient pressure to overcome the fluid head of the molten charge above filter 23, whereupon the inert gas passes downwardly through anular space 21, through hole 18 in the lower crucible 17, upwardly through filter disc 23, and then bubbles up through the molten charge. Meanwhile evacuation of gases above the molten charge is continued through valve 46.

Valve 52 is opened and then about ½ atmosphere of inert gas is admitted to the system through valve 47. The pressure of inert gas supplied through valve 36 is simultaneously regulated to a pressure at least equal to that admitted to the system above the filter but insufficient to cause further sparging.

By means of the probe 62 a magnesium metal piece 66 is lowered through the full flow valve 52 and the tubular section 37 and into the fused uranium-aluminum charge in the crucible 20. While magnesium-aluminum compositions form melts which solidify at temperatures as low as 432° C. and magnesium-zinc-aluminum compositions form melts freezing as low as 345° C. the formation of a magnesium metal-aluminum melt is much more rapid if heating is continued at a temperature of at least 660° C. Precipitation of uranium-aluminum intermetallic compound takes place as the magnesium metal fuses and enters the melt. Mixing is carried out mechanically as by raising and lowering the probe 62 in the melt or by gas sparging through the melt by increasing the inert gas pressure below the filter.

The furnace charge, comprising a mixture or slurry of precipitated uranium-aluminum intermetallic compound and a magnesium metal-aluminum melt containing some dissolved uranium, is permitted to cool to a temperature less than 200 centigrade degrees above the solidification temperature of the melt and is held at that temperature for a period of generally from 15 minutes to several hours, a period of one to two hours being preferred.

At the end of the holding period the inert gas pressure above the charge on filter disc 23 is increased by admitting inert gas through valve 47 and the space below the filter is evacuated by opening valve 35. Upon applying a pressure differential of about one atmosphere across the filter disc the magnesium metal-aluminum melt is forced through the filter disc while uranium-aluminum intermetallic compound still wetted by entrained magnesium metal-aluminum melt is retained.

Melt thereby forced through the filter disc is collected in lower crucible 17 while impure uranium-aluminum intermetallic compound retained on the filter disc may be treated further according to the several optional processing steps hereinabove described, or removed from the apparatus for further processing to separate residual magnesium metal. If the sidewalls of upper crucible 20 are provided with a slight downwardly inward taper above and near the filter disc, the constriction being greatest at the filter disc, the retained intermetallic compound is conveniently removed from the said crucible as follows: While the intermetallic compound is still wetted by residual magnesium metal-aluminum melt, but preferably after making a small addition of a magnesium metal and melting it in contact with the intermetallic compound whereby the pasty precipitate is rendered more fluid, the end of the probe 62 is lowered into the somewhat fluid precipitate layer, the filter is backflushed with an inert gas to free the pores thereof of magnesium metal-aluminum melt, and the mixture of intermetallic compound and melt is allowed to solidify around the end of the probe. Thereafter the solidified material is simply lifted out of the crucible by means of the probe.

In carrying out the invention according to another embodiment using the apparatus shown in FIG. 1 with the alternative lower portion as illustrated in FIG. 2, the apparatus is opened as by disconnecting flanges 82 and 41 and raising the super-structure. A prepared furnace charge is placed in crucible 87 and the apparatus reassembled. Gas lock section 39 is opened as by removing cap 56 having probe 62 extending therethrough and a prepared cleaned magnesium metal bar or rod 66 is threaded onto graphite adapter 65 at the lower end of the probe. The magnesium metal bar or rod is selected to comprise an appropriate amount of a magnesium metal to form, on heating with the uranium-aluminum charge, a magnesium metal-aluminum melt of a desired composition. The magnesium metal piece 66 and the lower end of the probe 62 are then inserted into the body of the gas lock and the gas lock is closed again with cap 56. The entire assembly is evacuated as through valves 46 and 59. Heating is started by turning on electrical heating elements 85. Evaluation, or outgassing, of the furnace assembly and the uranium-aluminum charge is continued as the charge is brought to a temperature in the range of 660 to 1000 degrees centigrade, and preferably to a temperature at least sufficient to cause fusion of the charge.

Valve 52 is opened and then about ½ atmosphere of inert gas is admitted to the system through valve 47.

By means of the probe 62 the magnesium metal piece 66 is lowered through the full flow valve 52 and the tubular section 37 and into the fused uranium-aluminum charge in the crucible 87. Heating is continued at a temperature sufficiently high to cause melting of the magnesium metal addition. Precipitation of uranium-aluminum intermetallic compound takes place as the magnesium metal fuses and enters the melt. Mixing is carried out mechanically as by raising and lowering the probe 62 in the melt.

The furnace charge comprising a mixture of precipitated uranium-aluminum intermetallic compound and a magnesium metal-aluminum melt containing some dissolved uranium is permitted to cool to a temperature less than 200 centigrade degrees above the solidification temperature of the melt and is held at that temperature for a period of generally from 15 minutes to several hours, a period of one to two hours being preferred. During the holding period precipitated uranium-aluminum intermetallic compound settles down into the apex of the cavity in crucible 87.

At the end of the holding period heating is stopped altogether and the entire charge in crucible 87 is allowed to cool and solidify. The apparatus is then opened as by disconnecting flanges 82 and 41 and raising the super-structure. Crucible 87 is lifted out of the heating chamber 8, and the solidified casting is removed from the crucible. Usually the crucible need not be sacrificed to obtain the casting as the casting seldom adheres tightly to a graphite crucible.

The boundary of the uranium rich portion of the casting is located by standard metallographic or radiological procedures. This uranium rich portion is then separated from the casting as by shearing or sawing and further processed if desired to remove entrained magnesium metal or, if desired, processed according to one or more of the optional processing steps hereinabove described to effect further purification of the uranium-aluminum compound as the end product.

In selecting the proportion of a magnesium metal to add to a uranium-aluminum melt to cause formation of a magnesium metal-aluminum melt and precipitation of uranium, resulting fixed minimum operating temperatures and dilution effects should be considered. The formation of the lower melting magnesium metal-aluminum compositions are to be preferred in obtaining complete precipitation of uranium. Magnesium-aluminum compositions containing from about 35 to 80 weight percent magnesium are relatively low melting viz., as low as 432° C., and may be formed and used if desired. However, uranium is more soluble in compositions containing a greater proportion of aluminum and in spite of the dilution effect of adding more magnesium, i.e., the generation of more magnesium-aluminum melt upon adding larger amounts of magnesium to a fixed amount of aluminum, the maximum recovery efficiency is obtained upon employing a low melting composition containing 55 to 75 percent of magnesium, as well as by carrying out a separation at a temperature less than 100 centigrade degrees above the solidification temperature of the melt.

If desired, separations can also be carried out at temperatures well above the solidification temperature of the magnesium metal-aluminum melt to avoid nucleation or coprecipitation effects. Practical consideration of recoveries would seem to limit separation temperatures to not more than 200 centigrade degrees above the solidification temperature of the melt.

On the other hand a proportion of magnesium as high as 90 percent may be used, if desired, for charges containing a concentration of uranium above about 5 percent, for although magnesium-aluminum compositions in the range of 80 to 90 percent magnesium exhibit a rather sharply increased, or higher, solidification temperature and although uranium solubility is greater in such melts at the higher solidification temperatures, uranium recovery is not reduced so greatly but what the use of more magnesium may be justified by the greater degree of purification of uranium effected per processing cycle. The tendency for more complete purification is believed to be a result of the effect on distribution coefficients using a larger amount of magnesium with a given amount of a uranium-aluminum composition, thereby tending to extract more impurities from the uranium phase. If purification of uranium is of prime importance it is preferred to form magnesium-aluminum melts ranging in magnesium content from about 66 percent magnesium, for the treatment of uranium-aluminum compositions containing only about 1 percent of uranium, to about 90 percent magnesium, for the treatment of compositions containing 5 percent or more of uranium.

As indicated hereinabove, up to 80 weight percent, but preferably no more than 50 weight percent, of the magnesium employed in the precipitation step may be replaced by zinc. Upon so-substituting zinc for magnesium in a composition containing nominally from 35 to 80 percent of magnesium the resulting magnesium-zinc-aluminum ternary composition which is formed is possessed of a melting point generally lower than that of a magnesium-aluminum binary composition. The magnesium-zinc-aluminum ternary eutectic temperature is about 340° C.

Since uranium has a greater solubility in zinc than in magnesium, zinc-containing melts will normally be employed where purification of uranium is of greater importance than uranium recovery efficiency.

In FIG. 3 is shown the solubility of uranium in magnesium, in 66.6% magnesium-33.3% aluminum and in 50% magnesium-50% aluminum. In FIG. 4 is shown the solubility of uranium in 37% magnesium-63% aluminum, and in aluminum. The solubility curves of FIGS. 3 and 4 show that at a given temperature the solubility of uranium is increasingly greater as the proportion of aluminum to magnesium is increased. In FIG. 6 is shown the solubility of uranium in the ternary melts 35% magnesium-35% zinc-30% aluminum and 50% magnesium-20% zinc-30% aluminum which might be formed in the precipitation step during the practice of the invention. The solubility curves of FIG. 6 show that at a given temperature the solubility of uranium tends to increase as the proportion of zinc to magnesium is increased but tends to decrease as the proportion of zinc to aluminum is increased. All solubility determinations were made in an apparatus similar to that shown in FIG. 1.

For each determination the appropriate magnesium-aluminum or magnesium-zinc-aluminum melt containing uranium was made up and held at a given temperature. From time to time a probe provided with an inverted sampling cup was used to obtain a filtered sample of the supernatant melt. Samples were taken until analysis showed the uranium content of several succeeding samples to be a constant value. This value was taken as the equilibrium uranium solubility at that temperature in the given melt composition.

In FIG. 4 is shown the solubility, as a function of temperature, of cerium, a typical fission product found in irradiated nuclear fuel, in a magnesium-aluminum melt saturated with uranium. It can be seen that cerium is relatively soluble in such a melt in terms of usual fission product concentrations. Thus cerium and similar fission products, if present in uranium-aluminum compositions treated according to the invention, tend to remain in the magnesium-aluminum melt while uranium is precipitated.

By means of relatively simple pretreatments hereinafter described, the invention is also readily adapted to the processing of uranium compounds and those uranium alloys that contain constituent metals not soluble in aluminum. Thus the method is broadly adaptable for the processing of most types of nuclear reactor fuel elements as well as fuel element fabrication plant scrap and ore concentrates. Metals present in concentrations below their solubility limits in the said magnesium metal-aluminum melts do not substantially interfere with the process.

Uranium compounds, e.g., the oxide, must be reduced to the metal or to a suitable alloy soluble in aluminum or a magnesium metal-aluminum melt. The reduction may be carried out directly with aluminum, if desired, thus forming a uranium-aluminum alloy or well known reduction methods utilizing calcium and magnesium metals may be used. Heretofore aluminum reduction has not been widely used because a simple method of separating uranium and aluminum was heretofore not known.

Zirconium alloys containing uranium are metallurgically corroded with molten aluminum, according to my copending application Serial No. 757,418, filed August 26, 1958, now U.S. Patent No. 2,963,361 issued December 6, 1960, to extract uranium values into the aluminum phase thus forming an aluminum-uranium alloy.

Aluminum-clad aluminum alloy nuclear reactor fuel elements need only to be stripped of non-uranium structural parts such as end nozzles and side plates.

Any of the above pretreatments performed on highly radioactive materials must of course be carried out by remote control and behind suitable shielding.

Fuel element scrap in each case is sorted to reject non-uranium containing material and the sorted fuel element scrap is treated in the same manner as the corresponding fuel element of similar composition.

The following examples are illustrative of the practice of the invention using the apparatus shown in FIG. 1 of the drawing.

*Example I*

The apparatus of FIG. 1 was opened by separating flanges 28 and 41 and a charge comprising 67.6 grams of Al, 2.10 grams of U and 0.13 gram of natural Ce (radioactive cerium is a typical fission product) was placed in crucible 20, the crucible having been previously outgassed at 700 to 800° C. The apparatus was then closed and the flanges were bolted together again. Cap 56 and probe 62 were removed together from gas lock section 39 and a prepared magnesium rod about ½ inch in diameter and weighing 140 grams was threaded onto graphite adapter 65 at the lower end of the probe. The probe was inserted in the gas lock and the gas lock was closed by threading the cap into place. With valve 52 closed, the entire assembly was evacuated through valves 35, 46, and 59, the heating chamber being evacuated to a pressure of $10^{-2}$ mm. of mercury. Heating elements 15 were then turned on and the furnace was heated to a temperature between 700 and 800° C. and held at that temperature for about 30 minutes during which time the mixture of aluminum, uranium and cerium melted together to form a molten alloy. Argon was admitted to the furnace through valves 36 and 47 simultaneously to bring the pressure in the furnace to about ½ atmosphere. Valve 52 was then opened and the magnesium rod was lowered by means of probe 62 through valve section 38 and section 37 and into the molten alloy in crucible 20. Heating of the furnace was continued and the furnace was held at a temperature between 700 and 800° C. for 45 minutes. During this time the magnesium rod melted and mixed with the uranium-aluminum alloy, causing precipitation of $UAl_3$. The furnace was then allowed to cool to 450° C. and held at this temperature for about an hour while additional $UAl_3$ precipitated. During this time the resulting slurry of solid uranium-aluminum compound in magnesium-aluminum melt was stirred occasionally by raising and lowering probe 62 in and out of the slurry. Argon was then admitted through valve 47 to increase the pressure above the slurry to about 1 atmosphere while valve 35 was opened and the space below filter disc 23 was evacuated. The liquid melt was thereby forced through the filter and collected in lower crucible 17 while solid uranium-aluminum compound was retained on the filter. Heating elements 15 were turned off and the entire assembly was allowed to cool to room temperature. The apparatus was opened by separating flanges 28 and 41 and raising the superstructure. Crucibles 20 and 17 were removed from the apparatus and the residue on filter disc 23 and the filtrate in crucible 17 were analyzed chemically. Results are as follows:

|         | Weight, g. | g. U | g. Ce |
|---------|------------|------|-------|
| Residue | 70.3       | 2.23 | .047  |
| Filtrate| 133.4      | .002 | .121  |

These results show that over 99.9 percent of the uranium recovered was present in the residue. Further, almost three fourths of the cerium was separated in one cycle.

*Example II*

An initial furnace charge comprising 64.8 grams of aluminum, 2 grams of uranium, and 1.65 grams of a neutron-irradiated aluminum-cerium alloy comprising 0.3 perment of cerium, the balance aluminum, was melted together and subsequently treated with 135 grams of magnesium in the apparatus of FIG. 1 and in the same manner as that described in Example I except for the following differences: (1) the initial charge was melted under an argon pressure of ⅓ atmosphere, (2) the magnesium was added under an argon pressure of ⅓ atmosphere, (3) melting of the magnesium into the initial charge was carried out at 750° C. for a period of 30 minutes, and (4) the holding period was limited to 30 minutes at 450° C. Results are as follows:

|         | Weight, g. | g. U | g. Ce  |
|---------|------------|------|--------|
| Residue | 18.7       | .18  | 0.0014 |
| Filtrate| 183        | .017 | .0028  |

The results show that 99 percent of the uranium recovered was in the residue.

*Example III*

An initial furnace charge comprising 63.5 grams of aluminum, 2 grams of uranium and 3.3 grams of a neutron-irradiated aluminum-cerium alloy comprising 0.3 percent of cerium, the balance aluminum, was melted together and subsequently treated with 134.5 grams of magnesium in the apparatus of FIG. 1 and in the same manner as that described in Example I except for the following differences: (1) the initial charge was melted under an argon pressure of ⅓ atmosphere, (2) the magnesium was added under an argon pressure of ⅓ atmosphere, (3) melting of the magnesium into the initial charge was carried out at a temperature in the range of 723 to 744° C. for a period of 30 minutes, and (4) the holding period was limited to 40 minutes at 600° C. Results are as follows:

|         | Weight, g. | g. U | g. Ce  |
|---------|------------|------|--------|
| Residue | 11.3       | 1.6  | 0.0031 |
| Filtrate| 167.4      | .038 | .0056  |

The results show that 97.5 percent of the uranium recovered was in the residue.

*Example IV*

The individual manipulative steps in this example were carried out in a manner similar to the corresponding steps of Example I. 30.4 grams of aluminum, 0.94 gram of uranium and 0.018 gram of cerium were placed in crucible 20 in the apparatus of FIG. 1. A ½ inch diameter rod of magnesium weighing 59.3 grams was attached to probe 62 and placed inside gas lock 39 and the gas lock evacuated. The remainder of the apparatus was evacuated and then repressurized to about ⅓ atmosphere with argon. Heating elements 15 were turned on and the furnace was heated until the charge in crucible 20 melted to form an alloy. Valve 52 was opened and the magnesium rod was lowered into the molten alloy in crucible 20. The furnace was brought to a temperature in the range of 762 to 782° C. and held at that temperature for 1 hour. During this time the magnesium rod melted and mixed with the uranium-aluminum alloy causing precipitation of solid uranium-aluminum compound from so formed magnesium-aluminum melt. The furnace was allowed to cool to 504° C. and held at that temperature for 30 minutes. Meanwhile the slurry of solid compound in the magnesium-aluminum melt was stirred occasionally by means of probe 62. The argon pressure above the slurry was then increased to about 1 atmosphere while the space below filter disc 23 was evacuated thus forcing the liquid melt through the filter disc while solid compound was retained. The filtrate was collected in crucible 17. Valve 52 was closed, gas lock 39 was opened and a second ½ inch diameter magnesium rod, weighing 59.5 grams, was attached to probe 62 and placed inside gas lock 39 and the gas lock evacuated. The argon pressure in the remainder of the system was reduced to about ½ atmosphere by briefly opening valves 35 and 46. Valves 36 and 47 were adjusted to maintain a zero pressure differential across the material on the filter disc. Valve 52 was opened and the second magnesium rod was lowered into crucible 20. The furnace was heated to 750° C. and held at that temperature for 30 minutes to cause the magnesium rod to melt and alloy with entrained magnesium-aluminum melt. The furnace was then cooled to 650° to 700° C. and held at that temperature for 30 minutes. The pressure differential across the material on the filter disc was increased as before to cause the liquid portion of that melt to pass through the filter disc. Valve 52 was again closed, gas lock 39 was opened and a third ½ inch diameter magnesium rod, weighing 60 grams, was attached to probe 62 and placed inside gas lock 39 and the gas lock evacuated. The pressure in the remainder of the system was reduced to ½ atmosphere and the pressure differential across the material on the filter disc was adjusted to zero as before. Valve 52 was opened and the third magnesium rod was lowered into crucible 20. The furnace was heated to 750° C. and held at that temperature for 30 minutes to cause magnesium to melt and bring about conversion of $UAl_3$ to $UAl_2$. The furnace was then cooled to about 650° C. and held at that temperature for 30 minutes. The pressure differential across the material on the filter disc was increased as before to cause the liquid portion of the melt to pass through the filter disc. The combined filtrates were collected in lower crucible 17. The furnace was allowed to cool to room temperature and the solidified combined filtrates and the residue on the filter were each removed from the apparatus and analyzed. Results are as follows:

|  | Weight, g. | g. U | g. Ce | X-ray identification |
|---|---|---|---|---|
| Residue | 1.7 | 0.92 | 0.00019 | $UAl_2$ |
| Filtrate | 201 | .01 | .018 |  |

The results show that 98.9 percent of the uranium recovered was in the residue and that the residue consisted of the intermetallic compound $UAl_2$ as a result of the magnesium washes. The results also show that 99 percent of the cerium was present in the filtrate.

A series of experiments was carried out to determine the amount of group II metal required at various temperatures to dissociate uranium-aluminum intermetallic compound according to the practice of the invention. $UAl_3$ was prepared by heating together 20 parts of uranium metal, 26.7 parts of aluminum and 53.3 parts of magnesium. The so-formed $UAl_3$ was allowed to settle and the concomitant melt was cooled to room temperature to form an ingot. The lower portion of the ingot containing the settled $UAl_3$ was cut off and found to contain 30 weight percent of uranium, 35 weight percent of aluminum and 35 weight percent of magnesium. The cut-off portion of the ingot was then cut in sections and individual sections were treated as follows. Each section was placed in a graphite crucible and heated together with a predetermined amount of a group II metal to an elevated temperature and under a protective atmosphere. After 1 hour the contents of the crucible were allowed to cool and solidify as a small casting. The solidified casting was sectioned and examined by X-ray diffraction and by microphotographs to identify species of metal compounds present. Results are as follows:

| Group II metal | Weight ratio, Group II metal to $UAl_3$ section | Temperature, ° C. | Form of uranium |
|---|---|---|---|
| Mg | 15 | 700 | $UAl_2$, $UAl_3$ |
| Mg | 30 | 700 | $UAl_2$ |
| Mg | 30 | 800 | $UAl_2$ |
| Mg | 30 | 700 | $UAl_2$ |
| Mg | 30 | 800 | U, $UAl_2$ |
| Mg | 120 | 700 | $UAl_2$ |
| Mg | 210 | 700 | U, $UAl_2$ |
| 55% Mg, 45% Zn | 12 | 700 | $UAl_3$ |
| 55% Mg, 45% Zn | 30 | 700 | $UAl_2$ |
| 55% Mg, 45% Zn | 30 | 800 | $UAl_2$ |
| 55% Mg, 45% Zn | 60 | 700 | $UAl_2$ |
| Zn | 9 | 700 | $UAl_2$ |
| Zn | 30 | 700 | $UZn_9$ |

The results of the experiments show that $UAl_3$ is fairly readily dissociated to $UAl_2$ but that the use of temperatures above 700° C. or the use of zinc are conducive to dissociating $UAl_2$ to U.

What is claimed is:

1. The method of recovering uranium as a uranium-aluminum intermetallic compound from a composition containing uranium and aluminum which comprises heating a mixture of the composition and a magnesium metal selected from the group consisting of magnesium and magnesium-zinc alloys containing at least 20 weight percent of magnesium to a temperature sufficient to form a precipitate of uranium-aluminum alloy in a melt comprising a magnesium alloy, the amount by weight of said magnesium metal being from about ⅓ to 10 times the weight of said uranium and aluminum, and separating the precipitate from the melt.

2. The method as in claim 1 in which the separated precipitate is heated to cause removal of a residual magnesium metal by vaporization.

3. The method of refining a composition containing uranium and aluminum which comprises heating a mixture of the composition and a magnesium metal selected from the group consisting of magnesium and magnesium-zinc alloys containing at least 20 weight percent of magnesium to a temperature sufficient to form a precipitate of uranium-aluminum alloy in a melt comprising a magnesium alloy, the amount by weight of said magnesium metal being from about ⅓ to 10 times the weight of said uranium and aluminum, separating the precipitate from the melt, washing the separated precipitate with a molten group II metal selected from the group consisting of magnesium, zinc, and binary alloys and mixtures thereof whereby the aluminum content of the precipitate is reduced, and the precipitate is heated to cause removal of residual said group II metal by vaporization.

4. The method of recovering uranium as a uranium-aluminum intermetallic compound from a composition containing metallic uranium and aluminum which comprises heating a mixture of the composition and a magnesium metal selected from the group consisting of magnesium and magnesium-zinc alloys containing at least 20 weight percent of magnesium to cause melting of the magnesium metal and at least a portion of the aluminum, thereby to form a solid intermetallic compound of uranium-aluminum, selected from the group consisting of $UAl_3$ and $UAl_2$, the amount by weight of said magnesium metal being from about ⅓ to 10 times the weight of said uranium and aluminum and separating the solid compound from the melt.

5. The method as in claim 4 in which the solid compound is separated from the melt by positive pressure filtration.

6. The method as in claim 4 in which the solid compound is separated by sedimentation so that the solid phase settles, allowing the so-settled mass to solidify, and then severing from the solidified mass that portion containing the said settled solid phase.

7. The method of recovering uranium as a uranium-aluminum intermetallic compound from a composition containing metallic uranium and aluminum which comprises heating a mixture of said composition and a magnesium metal selected from the group consisting of magnesium and magnesium-zinc alloys containing at least 20 weight percent magnesium to cause melting of the magnesium metal and at least a portion of the aluminum, the amount by weight of said magnesium metal being from about ⅓ to about 10 times the weight of said uranium and aluminum, agitating the mixture to cause mixing, and separating the resulting solid phase uranium-aluminum intermetallic compound from the melt.

8. A method of purifying uranium-aluminum alloy which comprises heating the impure uranium-aluminum alloy with a magnesium metal selected from the group consisting of magnesium and magnesium-zinc alloys containing at least 20 weight percent of magnesium to cause melting of the magnesium metal and at least a portion of the aluminum, thereby to form a solid intermetallic compound of uranium and aluminum, the amount by weight of said magnesium metal being from about ⅓ to 10 times the weight of said uranium and aluminum, cooling the so-formed mixture to a temperature not more than 200 centigrade degrees above the freezing temperature of the melt to allow further precipitation from the melt of said intermetallic compound of uranium and aluminum, and separating the so precipitated intermetallic compound from the melt.

9. The method of recovering uranium values as a uranium-aluminum intermetallic compound from a uranium-containing material comprising providing a uranium-aluminum alloy, heating a mixture of said alloy and a magnesium metal selected from the group consisting of magnesium and magnesium-zinc alloy containing at least 20 weight percent magnesium, to cause melting of the magnesium metal and at least a portion of the aluminum, the amount by weight of said magnesium metal being from about ⅓ to about 10 times the weight of said uranium and aluminum, agitating the resulting mixture and seperating the solid phase uranium-aluminum intermetallic compound precipitating from the agitated mixture.

10. A process adaptable for recovering uranium values as a uranium-aluminum intermetallic compound from a uranium-containing material comprising providing a composition containing metallic uranium and aluminum in a ratio by weight at least one part of uranium to 100 parts of aluminum; heating to at least 660° C. a mixture comprising a portion of the said composition and an amount of a magnesium metal by weight equal at least to the weight of the said portion, said magnesium metal being selected from the group consisting of magnesium and magnesium-zinc alloys containing at least 20 weight percent of magnesium, thereby forming a slurry of a uranium-aluminum intermetallic compound in a magnesium metal-aluminum melt; agitating the slurry; cooling the slurry to a temperature not more than 200 centigrade degrees above the freezing temperature of the melt thereby causing increased precipitation of an intermetallic compound of uranium and aluminum; and separating the so-formed precipitate from the mixture thereby recovering uranium in the form of uranium-aluminum intermetallic compound selected from the group consisting of $UAl_3$, $UAl_2$.

11. The method as in claim 10 in which the separated precipitate is washed with a molten group II metal selected from the group consisting of magnesium, zinc, and mixtures thereof, thereby reducing the aluminum content of the precipitate, and the so washed precipitate is heated to cause vaporization therefrom of residual group II metal.

12. The method of recovering uranium as a uranium-aluminum intermetallic compound from a composition containing metallic uranium and aluminum which comprises heating a mixture of the composition and a magnesium metal selected from the group consisting of magnesium and magnesium-zinc alloys, containing at least 20 weight percent of magnesium, to cause melting of the magnesium metal and at least a portion of the aluminum, the amount by weight of said magnesium metal being from about ⅓ to about 10 times the weight of said uranium and aluminum, separating the resulting solid phase from the melt, further treating at least once the separated solid phase by heating a mixture of the separated solid phase and a magnesium metal to cause melting of the magnesium metal and at least a portion of the aluminum content of the so-treated solid phase, and separating the resulting solid phase uranium-aluminum intermetallic compound from the melt.

13. The method as in claim 12 in which the further treatment of the separated solid phase comprises heating a mixture of the separated solid phase and a magnesium metal and aluminum to cause melting of the magnesium metal and at least a portion of the aluminum content of the mixture, and separating the resulting solid phase uranium-aluminum intermetallic compound from the melt.

14. The method of recovering uranium as a uranium-aluminum intermetallic compound from a composition containing metallic uranium and aluminum which comprises fusing the composition, heating a mixture of the fused composition and a magnesium metal selected from the group consisting of magnesium and magnesium-zinc alloys containing at least 20 weight percent of magnesium thereby precipitating therein an intermetallic compound of uranium and aluminum, the amount by weight of said magnesium metal being from about ⅓ to about 10 times the weight of said uranium and aluminum, agitating the mixture so obtained, then cooling it to a temperature not more than 200 centigrade degrees above the freezing temperature of the supernatant melt, and separating from the cooled mixture the so precipitated intermetallic compound of uranium and aluminum.

15. The method of recovering uranium as a uranium-aluminum intermetallic compound from a composition containing metallic uranium and aluminum which comprises fusing the composition, heating a mixture of the fused composition and a magnesium metal selected from the group consisting of magnesium and magnesium-zinc alloys containing at least 20 weight percent of magnesium, thereby precipitating therein an intermetallic compound of uranium and aluminum, the amount by weight of said magnesium metal being from about ⅓ to about 10 times the weight of said uranium and aluminum, agitating the mixture so obtained, then cooling it to a temperature not more than 100 centigrade degrees above the freezing temperature of the supernatant melt, and separating from the cooled mixture the so-precipitated intermetallic compound of uranium and aluminum.

16. A process adaptable for recovering uranium values from a uranium-containing material comprising providing a composition containing metallic uranium and aluminum in a ratio by weight at least one part of uranium to 100 parts of aluminum; heating to at least 660° C. a mixture comprising a portion of the said composition and an amount of a magnesium metal by weight equal at least to the weight of the said portion, said magnesium metal being selected from the group consisting of magnesium and magnesium-zinc alloys containing at least 20 weight percent of magnesium, thereby forming a slurry of a uranium-aluminum intermetallic compound in a magnesium metal-aluminum melt; agitating the slurry; cooling the slurry to a temperature not more than 200 centigrade degrees above the freezing temperature of the melt thereby causing increased precipitation of an intermetallic compound of uranium and aluminum; separating the so-formed precipitate from the mixture; sufficiently washing the separated precipitate with a molten group II metal selected from the group consisting of magnesium, zinc, and mixtures thereof, whereby the aluminum content of the precipitate is substantially eliminated; and heating the so-washed precipitate whereby residual group II metal is vaporized therefrom.

References Cited in the file of this patent

UNITED STATES PATENTS 2,922,711     Burris et al. _____ Jan. 26, 1960

OTHER REFERENCES

"Proceedings of the International Conference on the Peaceful Uses of Atomic Energy," vol. 9, 1956, pages 108, 109, 597, 598.